United States Patent
Hentschke (10) Patent No.: US 8,011,786 B2
(45) Date of Patent: Sep. 6, 2011

(54) MULTI-PERSPECTIVE REAR PROJECTION SYSTEM FOR AUTOSTEREOSCOPIC REPRODUCTION OF THREE-DIMENSIONAL DISPLAYS

(76) Inventor: Siegbert Hentschke, Kassel (DE)

( * ) Notice: Subject to any disclaimer, the term of this patent is extended or adjusted under 35 U.S.C. 154(b) by 526 days.

(21) Appl. No.: 12/095,366

(22) PCT Filed: Dec. 1, 2006

(86) PCT No.: PCT/DE2006/002145
§ 371 (c)(1),
(2), (4) Date: Aug. 20, 2008

(87) PCT Pub. No.: WO2007/062644
PCT Pub. Date: Jun. 7, 2007

(65) Prior Publication Data
US 2009/0033873 A1    Feb. 5, 2009

(30) Foreign Application Priority Data
Dec. 4, 2005  (DE) .......................... 10 2005 058 586

(51) Int. Cl.
*G02B 27/22* (2006.01)
(52) U.S. Cl. ............................. 353/7; 348/59; 359/466
(58) Field of Classification Search ...... 353/7; 359/462, 359/463, 464, 465, 620–624; 348/56, 59, 348/54
See application file for complete search history.

(56) References Cited

U.S. PATENT DOCUMENTS

| | | |
|---|---|---|
| 3,187,339 A | 6/1965 | Clay |
| 3,504,059 A | 3/1970 | Glenn |
| 4,541,007 A | 9/1985 | Nagata |
| 5,223,925 A | 6/1993 | Hattori |
| 5,430,474 A | 7/1995 | Hines |
| 6,212,007 B1 | 4/2001 | Hentschke |
| 6,307,585 B1 | 10/2001 | Hentschke |

(Continued)

FOREIGN PATENT DOCUMENTS

DE    1 547 915    2/1970

(Continued)

OTHER PUBLICATIONS

Neil A. Dodgson: "Autostereoscopic 3D Displays" IEEE Publication, Aug. 2005. (In English).

(Continued)

*Primary Examiner* — Tony Ko
(74) *Attorney, Agent, or Firm* — Michael J. Striker (57) ABSTRACT

Disclosed is a multiperspective backprojection system for autostereoscopically displaying three-dimensional representations. Said backprojection system comprises a backprojection screen (2) and an image generation unit (1) which is disposed behind the backprojection screen (2) and is provided with a projector (7a to 7p) for each perspective of the three-dimensional representations. The rear face (3) of the backprojection screen (2) is fitted with a first lenticular screen plate (8) while the front face (4) thereof is equipped with a second lenticular screen plate (9). The inventive backprojection screen (2) encompasses a third lenticular screen plate (10) between the first lenticular screen plate (8) and the second lenticular screen plate (9). The three lenticular screen plates (8, 9, 10) are provided with parallel cylindrical lenses. The first and the second lenticular screen plate (8, 9) have the same number of lenses while the third lenticular screen plate (10) has at least N times as many lenses as the first lenticular screen plate (8), N being equal to the number of perspectives.

12 Claims, 8 Drawing Sheets

U.S. PATENT DOCUMENTS

| | | | |
|---|---|---|---|
| 2001/0004298 A1* | 6/2001 | Kobayashi | 359/462 |
| 2001/0013971 A1* | 8/2001 | Kleinberger et al. | 359/465 |
| 2002/0118452 A1* | 8/2002 | Taniguchi et al. | 359/463 |
| 2002/0141056 A1* | 10/2002 | Kobayashi et al. | 359/462 |
| 2003/0039031 A1 | 2/2003 | Redert | |

FOREIGN PATENT DOCUMENTS

| | | |
|---|---|---|
| DE | 196 40 936 | 4/1998 |
| DE | 196 46 046 | 1/1999 |
| DE | 198 53 608 | 5/2000 |
| WO | 00/35204 | 6/2000 |

OTHER PUBLICATIONS

R. Boerner: "Autostereoskopische Rueckprojektions- Und Flachbildschirme" 8195 Fernseh-Und Kino-Technik 48 Nov. 1994, No. 11, Heidelberg, Germany.

* cited by examiner

MULTI-PERSPECTIVE REAR PROJECTION SYSTEM FOR AUTOSTEREOSCOPIC REPRODUCTION OF THREE-DIMENSIONAL DISPLAYS

The invention relates to a multi-perspective rear projection system, having a rear projection wall, for autostereoscopic reproduction of three-dimensional displays, in accordance with the preamble to claim 1.

Compared with two-dimensional conventional displays, a three-dimensional display comes closer to natural vision habits. The development of devices for the most possible natural three-dimensional display of objects, scenes, and animations is the subject of numerous scientific works and patent applications (such as German Patents DE 196 40 936 C2, DE 196 46 046 C1, and DE 198 53 608 C2).

A rear projection system of the generic type mentioned at the outset is known from a publication by Neil A. Dodgson, in "Autostereoscopic 3D Displays", Computer, August 2005, pp. 31-36, ISSN: 0018-9162, IEEE Publication. In it, a reproduction device for three-dimensional displays having a plurality of projectors, a rear projection wall, and an observer zone is described. Each of the projectors reproduces precisely one perspective of the three-dimensional displays. The rear projection wall has a double lenticular disk, not described in further detail. The perspective distributions attainable with such rear projection walls are not optimal and therefore at least sometimes furnish blurry pictures.

From a publication by Reinhard Börner in "Autostereoskopische Rückproiektions—und Flachbildschirme", Fernseh— und Kino-Technik ["Autostereoscopic Rear Projection and Flat Screens", Television and Motion Picture Technology], 48th year, No. 11, 1994, pp. 594-600, a similar rear projection system is known, but it has only one projector. The reproduction of different perspectives is done here by dividing the picture into picture strips, with one group of picture strips forming a "left-hand" picture and another group of picture strips forming a "right-hand" picture of a three-dimensional display. The rear projection wall comprises a diffuser (diffuser disk), which faces toward the projector, and a lenticular disk, which faces toward the observer. This kind of rear projection system furthermore requires a viewer detector (eye tracker), with which the position of an observer's head is detected. Based on the detected head position, the lenticular disk or the projection lens element is tracked in such a way that the observer can see a three-dimensional view of a display in whatever position the observer is in at the time. This is technologically complex and functions only within a very small area. Moreover, an unwanted pronounced loss of brightness is annoying to the observer, since some of the light emitted by the projector is absorbed by the diffuser is scattered and hence is unavailable for reproducing the three-dimensional display for the observer.

Based on this, it is the object of the invention to improve the multi-perspective rear projection system of the generic type defined at the outset in such a way that a more-precise distribution of the various perspectives and thus a greater reproduction sharpness and better picture quality are attained, and the loss of brightness described is reduced in a simple way.

The characteristics of the body of claim 1 serve to attain this object.

The invention has the advantage that by the use of a third lenticular disk, with a number of lenses increased N times, the separation of the various perspectives is substantially better than it has been until now, and sharp three-dimensional displays are obtained. The rear projection system of the invention is therefore highly suitable above all for autostereoscopic large projections and for a plurality of observers. In comparison to the diffuser otherwise used, lenticular disks moreover have only slight absorption and scattering, so that without further provisions, an increase in the optical efficiency is obtained as an additional advantage; the term optical efficiency is understood to mean the ratio of the light efficiency that is emitted from a picture generating unit located behind the rear projection wall and the light efficiency that is emitted from the front side of the rear projection wall and is received by the observer.

Further advantageous features of the invention will become apparent from the dependent claims.

The invention is described in further detail below in conjunction with the accompanying drawings, in terms of exemplary embodiments. Shown are.

Figure 1:
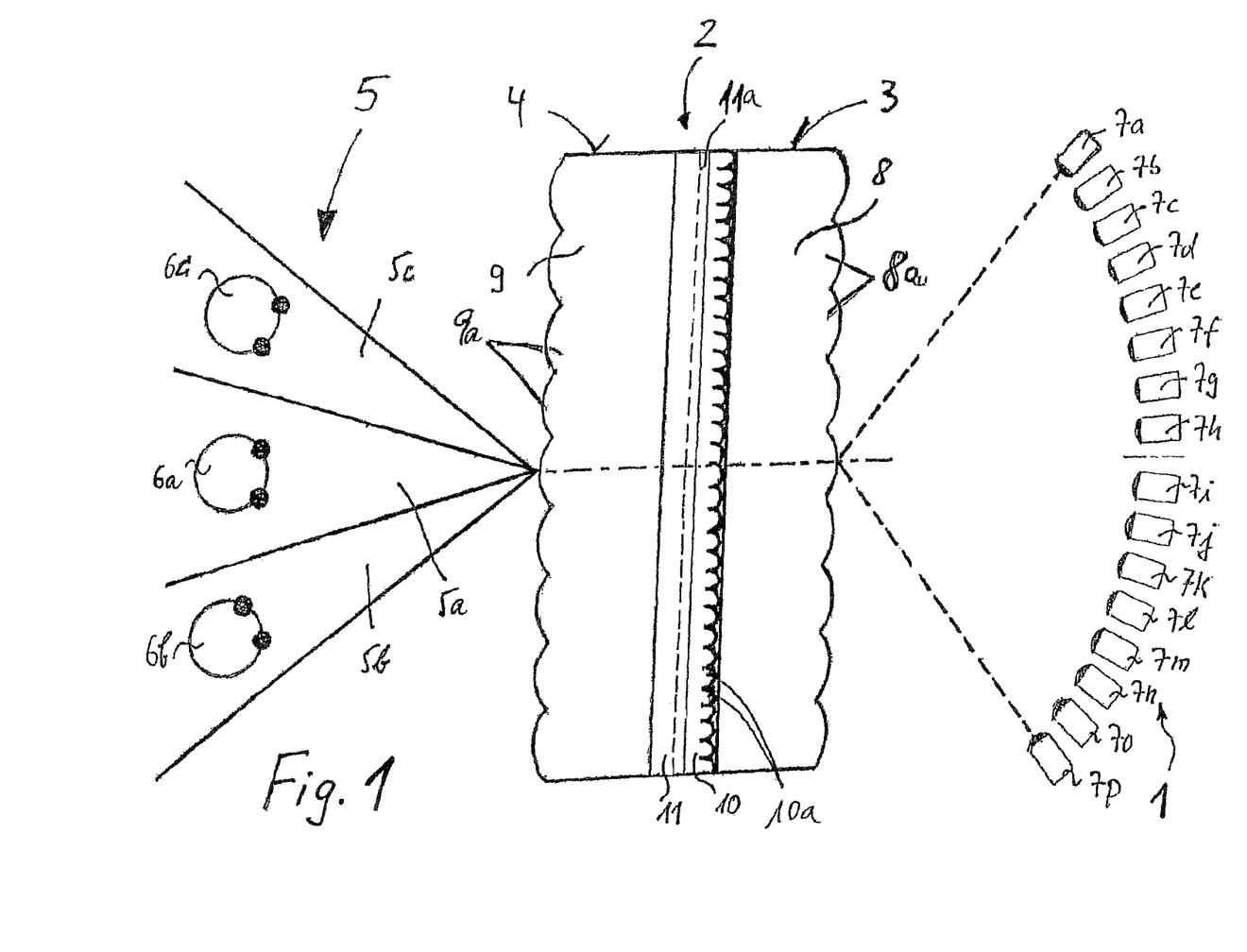
FIG. 1, schematically, a rear projection system of the invention.

FIG. 1 shows a multi-perspective rear projection system for autostereoscopic reproduction of three-dimensional displays. The rear projection system has a picture generating unit 1 and a rear projection wall 2 that has a back side 3 facing toward the picture generating unit 1. In front of a front side 4 of the rear projection wall 2 is an observer zone 5, in which an observer 6a, 6b, 6c can view the three-dimensional displays reproduced on the rear projection wall 2. The picture generating unit 1 located behind the back side 3 of the rear projection wall 2 has a plurality of preferably horizontally adjacently located projectors 7a through 7p, and each projector 7a through 7p reproduces precisely one perspective of the three-dimensional displays, focuses it onto the rear projection wall 2, and therefore reproduces the perspective furnished by it on the rear projection wall 2. The back side 3 of the rear projection wall 2 is formed by a first lenticular disk 8, and the front side 4 is formed by a second lenticular disk 9.

Rear projection systems of this or similar kinds are known from the publications mentioned above by Neil A. Dodgson and Reinhard Börner, which are hereby made the subject of the disclosure of the present invention, to avoid repetition.

According to the invention, between the two lenticular disks 8 and 9, the rear projection wall 2 has a third lenticular disk 10, and in an exemplary embodiment that is presently considered to be the best, it has a fourth lenticular disk 11 as well, between the second lenticular disk 9 and the third lenticular disk 10. All four lenticular disks 8 through 11 expediently comprise cylindrical lenses, and the axes of the cylindrical lenses of the lenticular disks 8, 9 and 10 extend parallel to one another and in the same direction, which in the installed state of the rear projection system is as a rule the vertical direction, while the axes of the cylindrical lenses of the fourth lenticular disks 11 extend transversely to the vertical. Especially advantageously, the axes of the cylindrical lenses of the lenticular disk 11 are perpendicular to those of the three other lenticular disks 8 through 10; in other words, in the installed state, they extend essentially horizontally.

Figure 5:
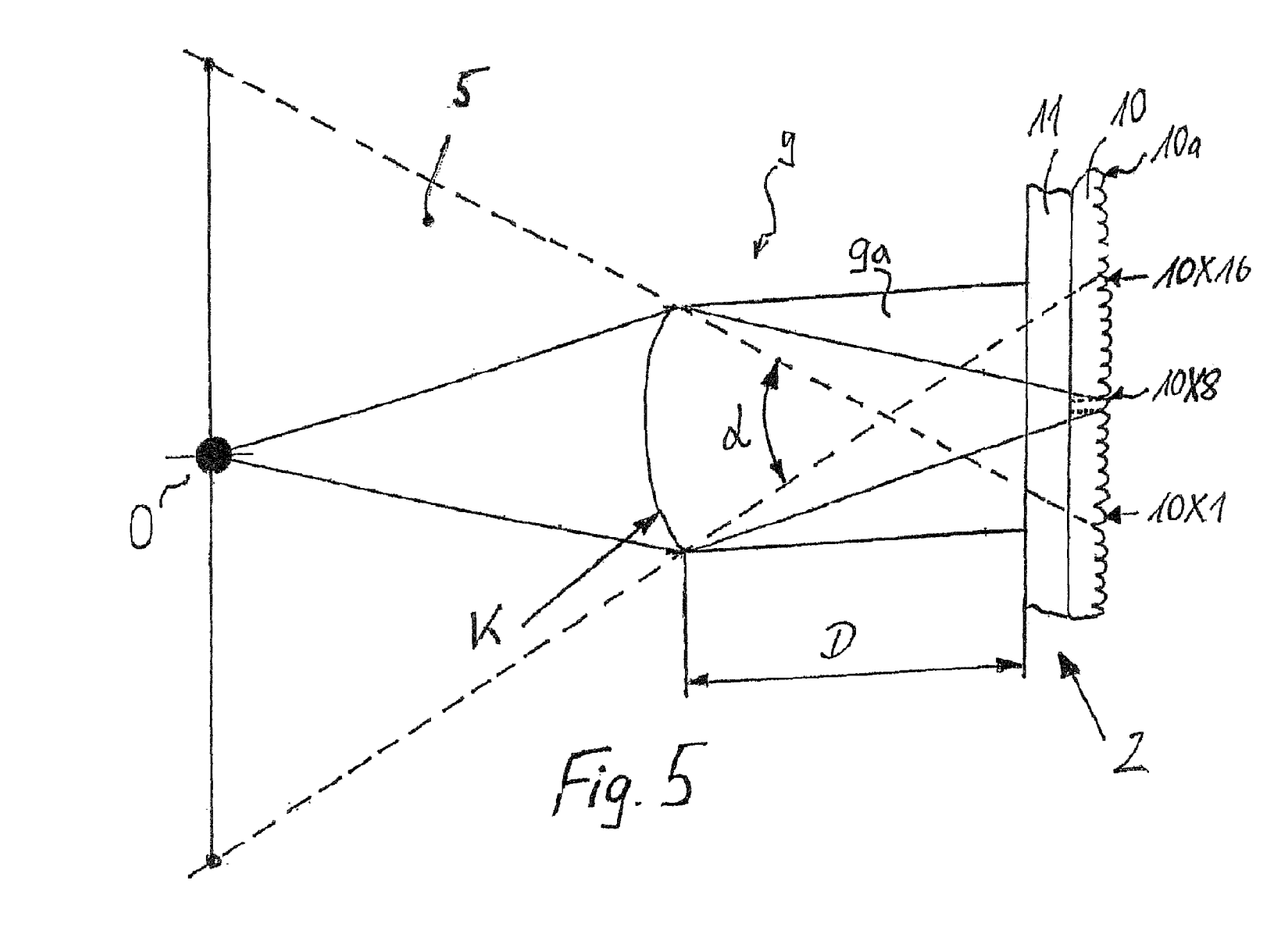
FIG. 5, schematically, enlarged and as an example, the beam path inside an observer zone.

The lenses of the lenticular disk 10 serve the purpose of separating the beams of light, arriving from the various projectors 7a through 7p, from one another in the horizontal direction; that is, they emit the light, belonging to each perspective, into a defined zone separated from the other perspectives. The spacing among these zones should naturally be selected such that at least in the observer zone 5, it is less than the usual spacing between the eyes, so that an observer can receive different perspectives with both eyes. Conversely, the lenses of the lenticular disk 11 serve the purpose of diffracting and distributing the light in the vertical direction, without affecting the horizontal distribution, so that an observer can see the 3D views correctly in the vertical direction as well.

Figure 2:
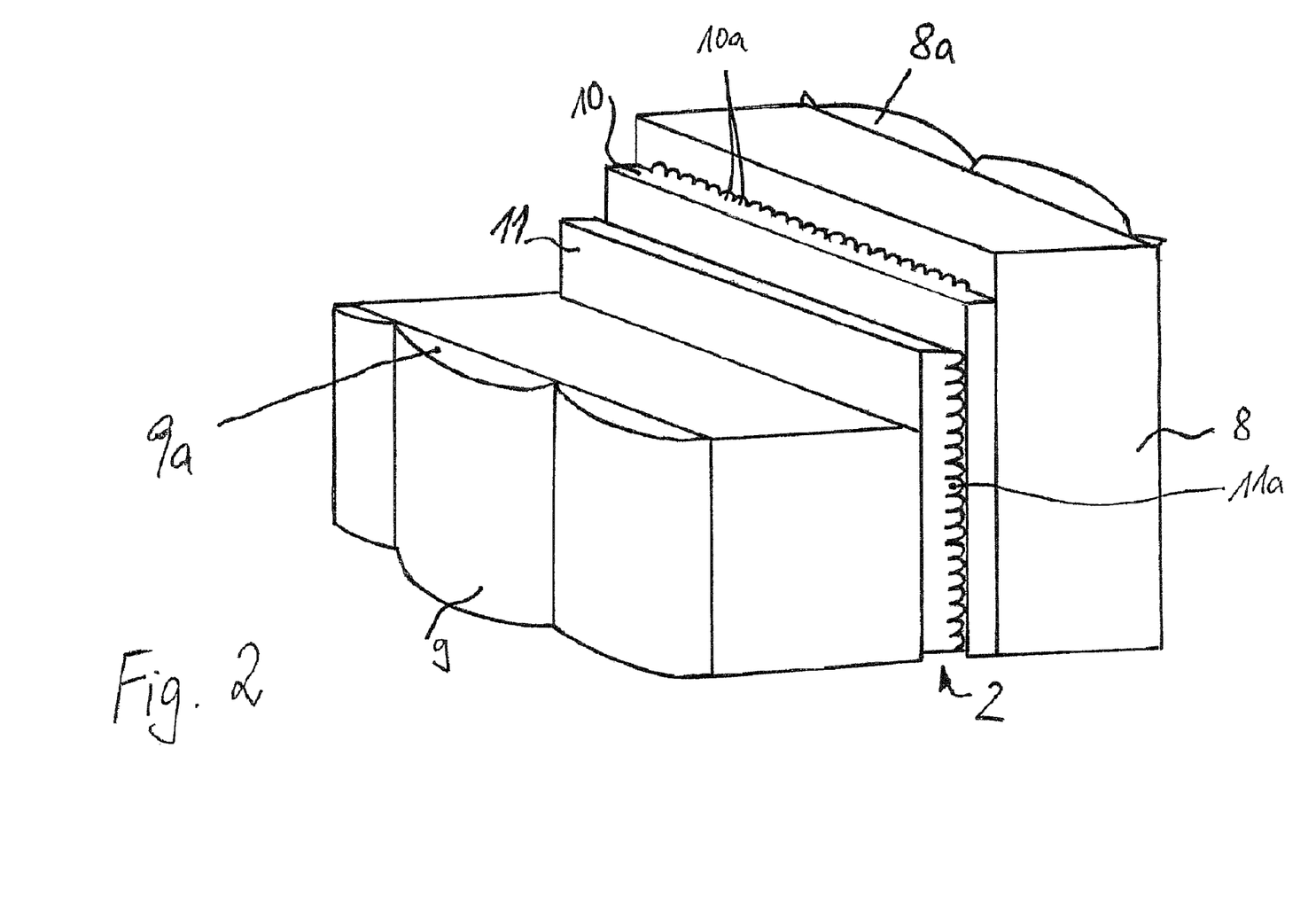
FIG. 2, a schematic perspective view of a rear projection wall according to the invention.

FIG. 2 shows the layout of the rear projection wall 2 of the invention in a perspective view of a detail thereof. The first lenticular disk 8 is located on the back side 3, which faces toward the picture generating unit 1. It is followed, in the direction toward the front side 4, first by the third lenticular disk 10 and contacting the third lenticular disk 10 then the fourth lenticular disk 11, with lenses 11a that extend transversely to lenses 10a of the third lenticular disk 10 and also transversely to lenses 8a and 9a of the other lenticular disks 8 and 9, which in FIG. 2 are expediently all embodied as essentially semicylindrically. Finally, the first lenticular disk 9 follows, forming the front side 4 of the rear projection wall 2. All four disks 8, 9, 10 and 11 are joined together, for instance by gluing or the like, into a solid structural unit that forms the rear projection wall 3. Alternatively, the disks 8 through 11 are held together by means of a peripheral seal and are pressed against one another by underpressure.

Figure 3:
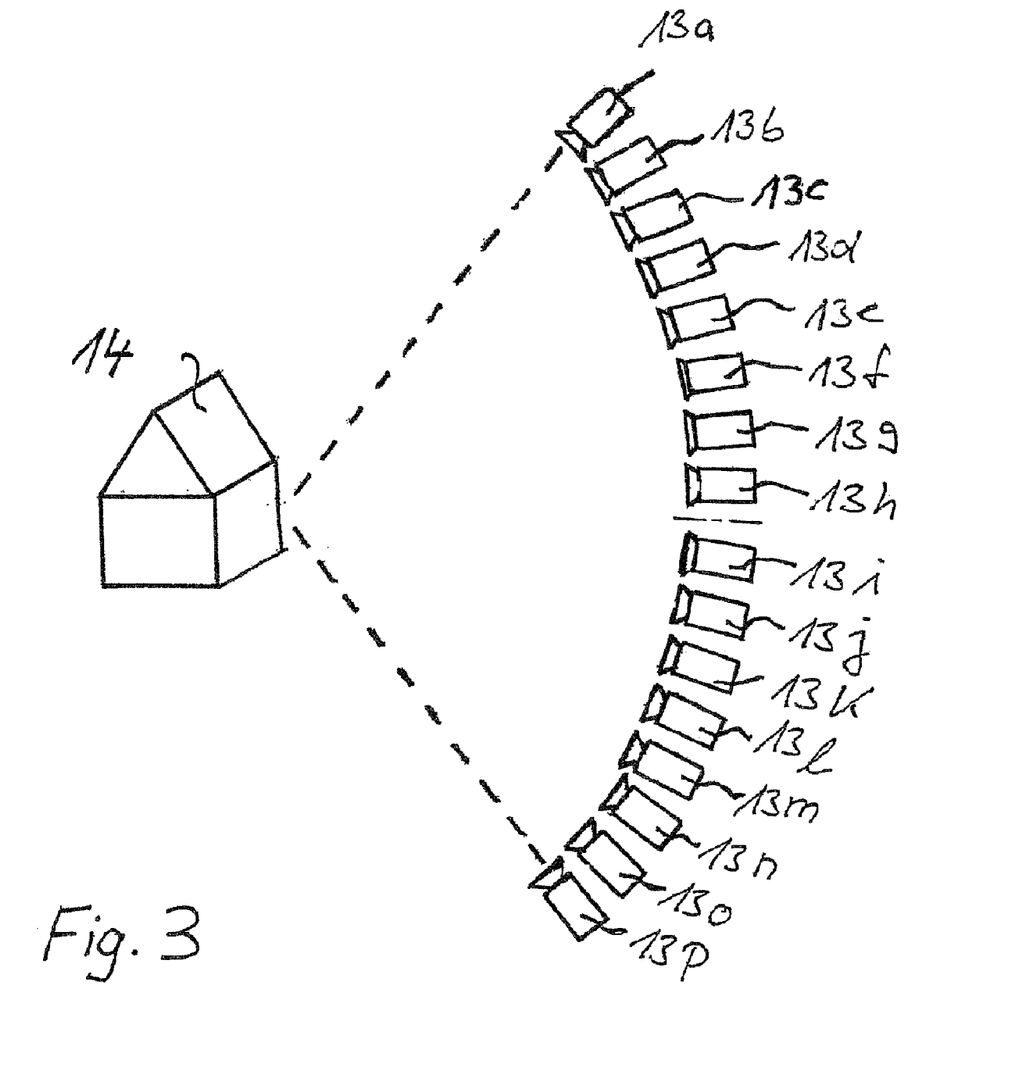
FIG. 3, schematic camera assemblies for recording various perspectives of an object.

FIG. 3 shows one example of an arrangement of a plurality of cameras 13a through 13p for taking pictures for the three-dimensional display of an object 14 shown here, or scene or animation. Each of the cameras 13a through 13p shown displays precisely one perspective of the object 14 of which a picture is to be taken. For reproduction of the three-dimensional display, the various perspective pictures are either forwarded immediately to the projectors 7a through 7p as in FIG. 1, or they are buffer-stored in a picture memory for later reproduction and at the reproduction time are delivered to the projectors 7a through 7p. A corresponding procedure is employed in displaying moving pictures (scenes, animations).

Figure 4:
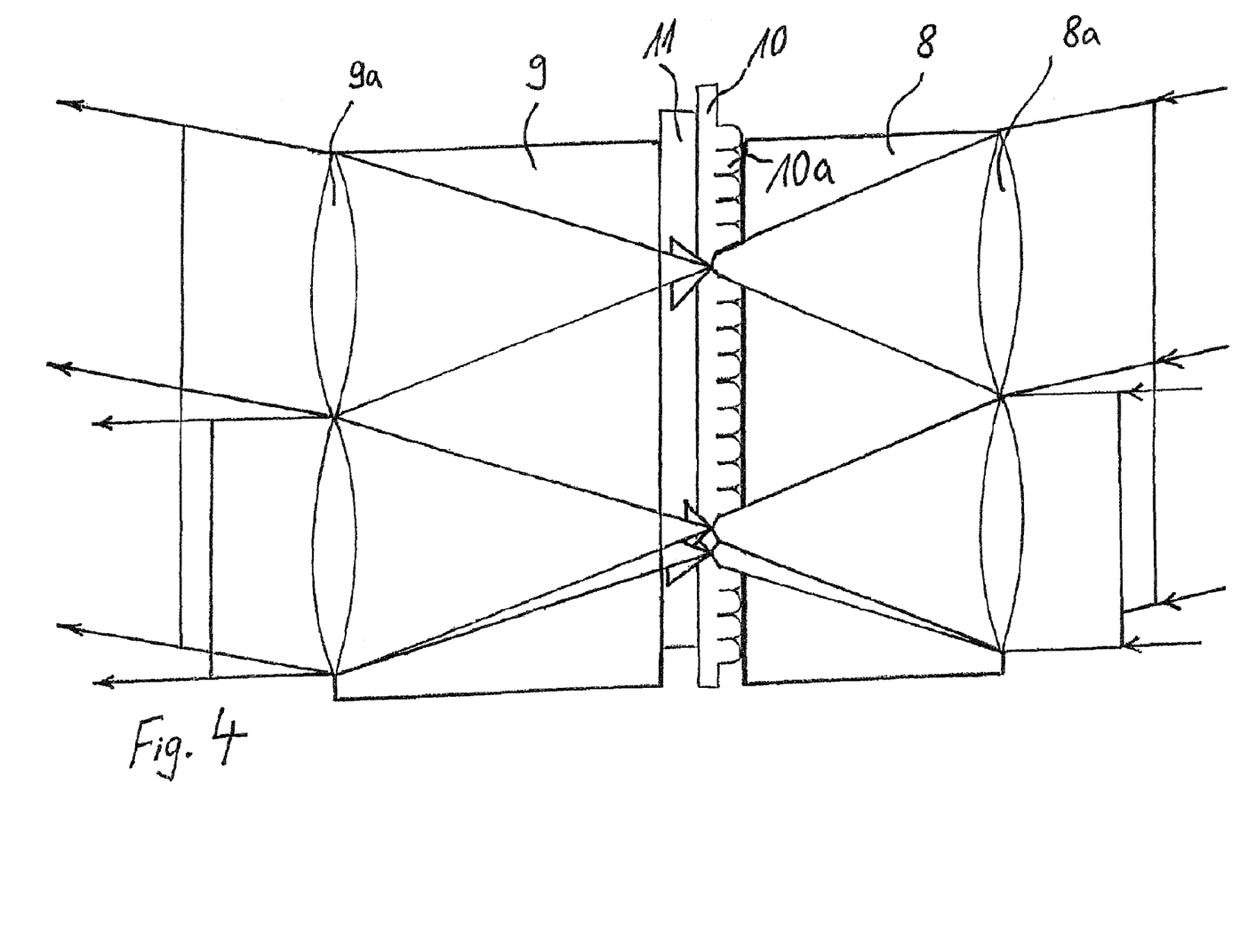
FIG. 4, a schematic view of a detail of the rear projection wall of the invention, with individual, exemplary beam paths.

FIG. 4 roughly schematically shows an enlarged detail of the rear projection wall 2, which has the layout already explained in conjunction with FIGS. 1 and 2 comprising the first lenticular disk 8, the third lenticular disk 10, the fourth lenticular disk 11, and the second lenticular disk 9. Details of the layout of the rear projection wall 2 and of the various lenticular disks will now be described.

First, it is assumed that all the lenticular disks 8, 9, 10, 11 have the same dimensions in terms of their length and width, and that the number and width of the lenses 8a of the lenticular disk 8 correspond to the number and width of the horizontal picture elements, for instance 1280 pixels, of the pictures that are generated on the rear projection wall 2 by the projectors 7a through 7p, or in other words the number of vertical partial picture strips. The number of lenses 10a of the lenticular disk 10 is then the product of the number of lenses 8a of the lenticular disk 8 and the number N of the various perspectives. If there are 16 perspectives and 1280 lenses 8a, then the number of lenses 10a of the lenticular disk 10 is 20480, for instance; that is, N lenses 10a are associated with each lens 8a, where N is equal to the number of perspectives (in this case, N=16; see FIG. 1). Thus the total width of 16 lenses 10a of the third lenticular disk 10 is approximately equal to the width of one lens 8a of the first lenticular disk 8. The total width of 16 lenses 10a of the third lenticular disk 10 also corresponds approximately to the width of one lens 9a of the second lenticular disk 9.

For the sake of better comprehension, the dimensioning of the lenticular disks 8 through 10 will now be described in conjunction with FIG. 5. A single lens 9a of the lenticular disk 9 and the lenses 10a, in this case 16 of them, associated with it of the lenticular disk 10 will be considered in detail. According to the invention, the arrangement is made such that the mode of operation described below results.

Based on a mean observer point 0 within the observer zone 5 (FIG. 1) with the angle α, the following conditions must be met for the function of the rear projection system of the invention:

a) The opening angle α, which may for instance be from 30° to 50°, designates the horizontally extending observer zone or primary zone 5 in FIG. 5 (see also FIG. 1), in which all the perspectives 1 . . . 16 appear horizontally next to one another and therefore each appears only once. An observer 6a (FIG. 1) who is located at a mean observation point 0 that is located in a portion 5a (FIG. 1) of the primary zone 5, should be able, through the lens 9a of the second lenticular disk 9, of seeing an associated, middle lens 10a of the third lenticular disk 10, such as a lens 10×8, and on both sides of this should be able to see some further lenses 10a as well. In this way, as a function of his precise location, the observer 6a sees for instance the ninth perspective with one eye and the eleventh perspective with the other eye. Since every lens 8a is associated with a vertical partial picture strip of the perspectives, in this way the same partial picture strips, but originating in the two perspectives, are seen. Since the same is correspondingly true for all the other lenses 8a and the lenses 10a associated with them, the observer 6a thus sees the entire display with for example the ninth and eleventh perspectives. By moving his head side to side, however, it should also be possible for the observer to observe the displays with the neighboring perspectives, or in other words for instance with the eighth and tenth perspectives or with the tenth and twelfth perspectives.

b) If the observer is moving along a horizontal line, parallel to the rear projection wall 2, within the angle α, for instance into a portion 5b, as indicated by an observer 6b in FIG. 1, then for instance at the outer limit he must be able to see the last perspective outward, for instance the sixteenth perspective, through the associated lens 10×16 and some perspectives located before it, so that as a function of where he is currently standing, he sees the fifteenth perspective with one eye, for instance, and the thirteenth perspective with the other. Similar conditions result for a portion 5c located on the other side, where an observer 6c, depending on his location at the moment, can see for instance the second and fourth perspectives, with the outer limit of the portion 5c being specified by the lens 10×1 and the associated first perspective. Therefore if the observer changes his location within the primary zone 5, he can observe the display from various perspectives. The spacing of the two perspectives viewed simultaneously with both eyes naturally depends on the distance of the observer from the rear projection wall 2 and to a certain extent also on the spacing between his eyes.

Figure 6:
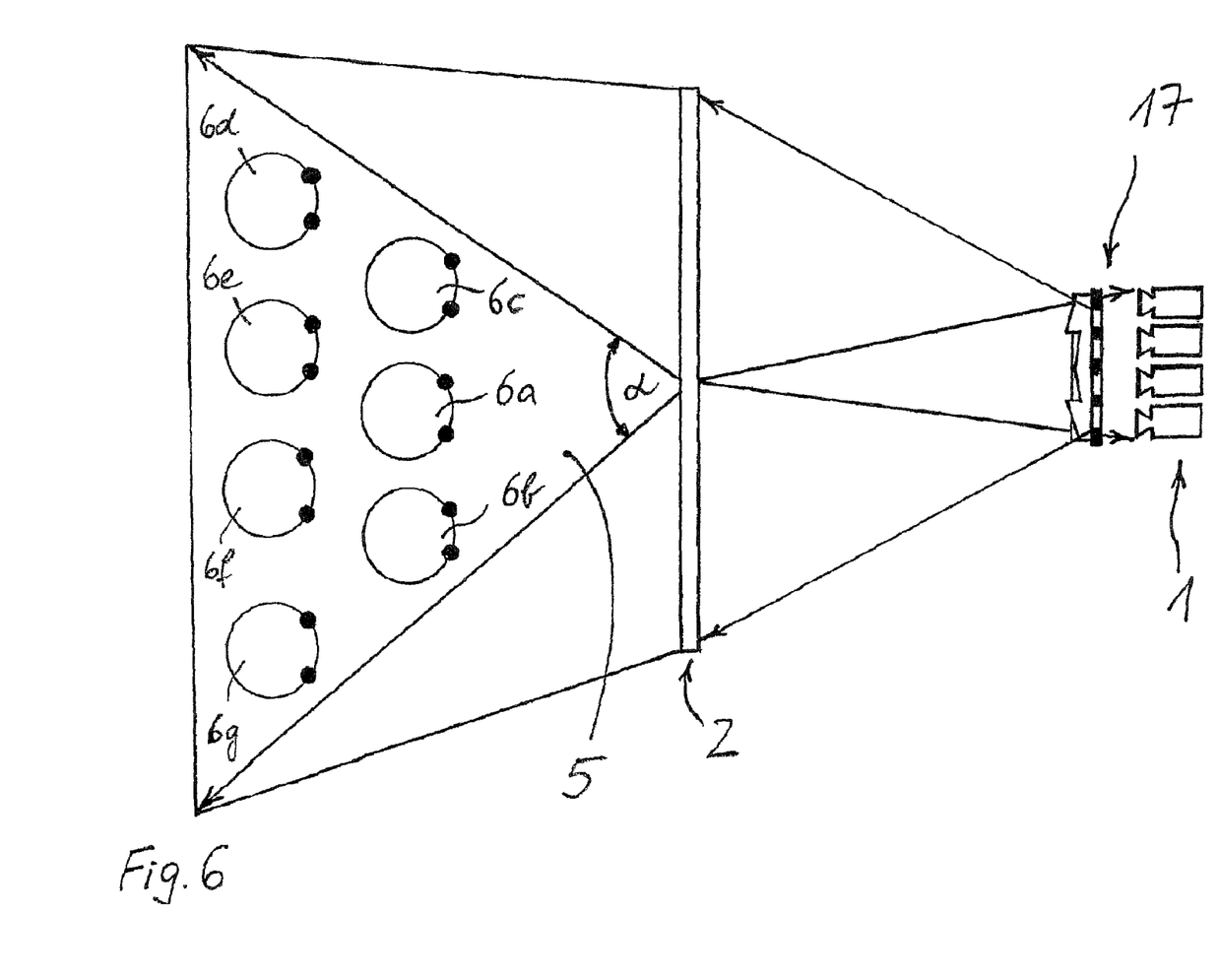
FIG. 6, schematically, the use of a 3D rear projection system of the invention for a plurality of observers.

As FIG. 1 shows, the various displays can be seen simultaneously as needed even by three observers, for instance, who are located at the locations indicated in FIG. 1 for the observer 6a, 6b and 6c. Each observer can furthermore move his head to the right or left to a certain extent, so as to observe the displays from slightly altered perspectives. Overall, the result is a great number of possibilities. This is also shown by FIG. 6, in which four further observers 6d through 6g are indicated in the observer zone 5. Overall, the conditions should therefore be selected according to the invention, and the numbers and widths of the lenses should be adapted to one another, in such a way that at the location of each observer within a selected observer zone, the spacing between the eyes is greater than the spacing of two perspectives, and therefore each observer can view two different perspectives with his eyes.

The conditions described are repeated to the right and left of the observer zone 5, although with reduced quality. Therefore further observers can in principle see the displays still three-dimensionally even in zones to the right and left of the observer zone 5.

To assure the conditions a) and b), the thickness D and the curvature K (FIG. 5) of the lenses 9a of the second lenticular disk 9 are determined to suit the optical diffraction principles and the principles of geometrical optics, based on a selected, mean observation point O and a selected angle α, by means of an iterative calculation process. The same is correspondingly true for the other lenses.

In FIG. 1, three different observer zones 5a, 5b, 5c for the three observers 6a, 6b and 6c are shown. These zones result for various viewing directions, in which the observers look for instance through the left or right side parts of the lenses 9a (see FIG. 5) to the adjacent lenses 10a that produce the perspectives of the third lenticular disk 10. Naturally, the choice of the three portions is purely arbitrarily selected; that is, in fact, the primary zone 5 represents the zone in front of the rear projection wall 3 in which the three-dimensional displays are readily visible.

The invention has the advantage among others of averting conflicts in accommodation (problems in adaptation of the eyes in focusing). Accommodation conflicts often occur in 3D motion picture systems at present, which use only two perspectives, and which employ polarization techniques and glasses to separate the left and right perspectives. For many motion picture viewers, accommodation conflicts furthermore cause headaches.

So that an observer 6a, 6b, 6c can see the partial picture strips well even in full vertical resolution, these strips are fanned out vertically by the fourth lenticular disk 11 (see also FIG. 2). In simplified terms, it can be said that a picture is "created" in the third lenticular disk 10 and is made visible vertically for the observer by the fourth lenticular disk 11. Analogously to the horizontal observer zone, the result is also a vertical observer zone with an opening angle of 30° to 50°, for instance. It has also proved advantageous to dimension the lens width of the transversely extending lenses 11a of the fourth lenticular disk 11 such that it corresponds to the lens width of the lenses 10a of the third lenticular disk 10 (FIG. 2).

Because of the non-parallel beams of light from the projectors 7a through 7p to the first lenticular disk 8 and from the third lenticular disk 10 to the second lenticular disk 9, it is advantageous for the lens width of the lenses 8a of the first lenticular disk 8 and the lens width of the lenses 9a of the second lenticular disk 9 to be made less than the total width of sixteen lenses 10a of the third lenticular disk 10. Advantageously, the width of the lenses 8a and 9a is reduced by a fraction of the width of one lens 10a, so that the number of lenses 10a that are associated with one lens 8a can be equal to or greater than the number of existing projectors 7a through 7p and hence perspectives.

Figure 7:
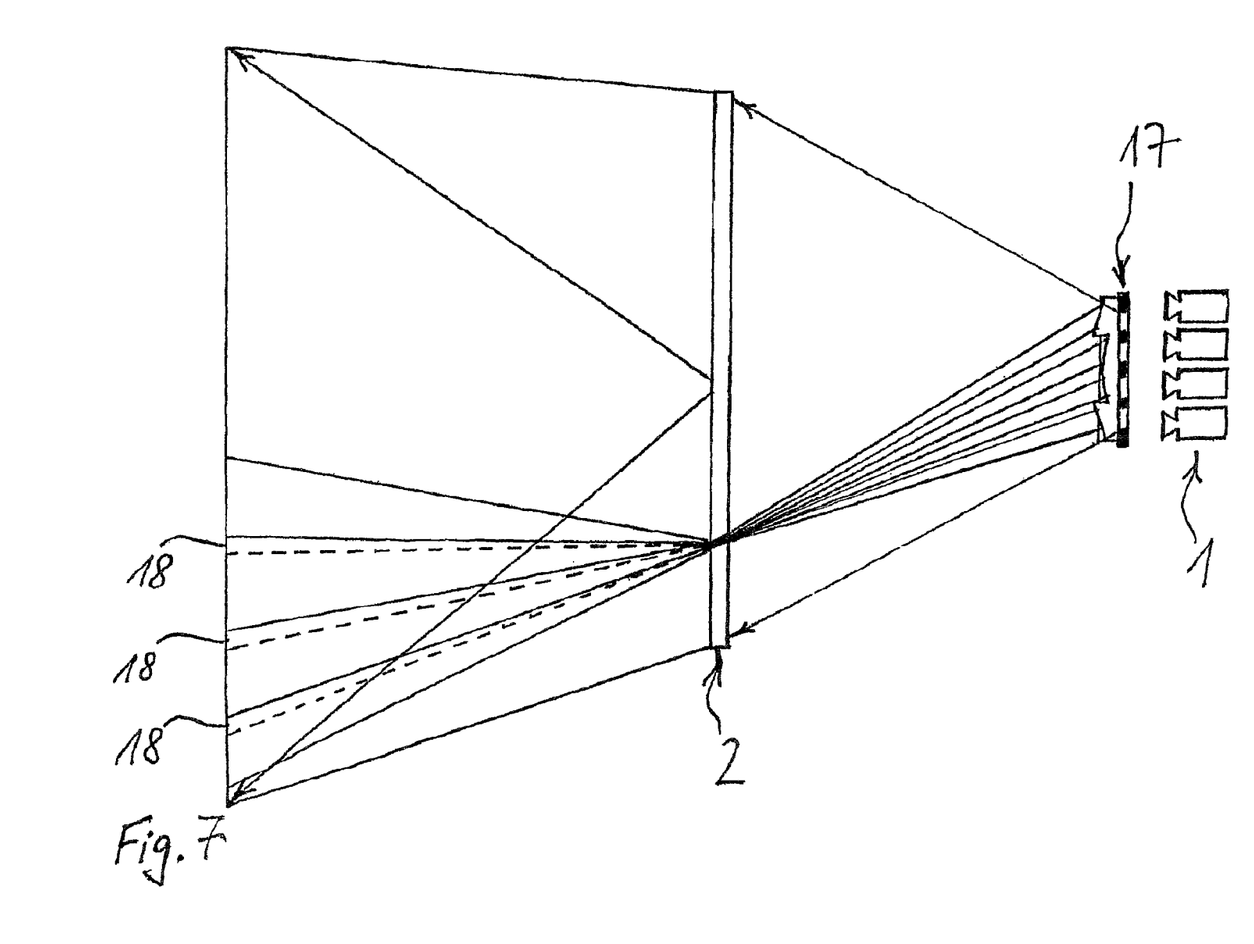
FIG. 7, schematically, a number of overlapping zones (partial picture overlaps) among the individual perspectives.

In an arrangement of a plurality of projectors 7a through 7p as in FIG. 1, which are correctly oriented when they are aimed at the center point of the rear projection wall 2, distortion from skewed projection faces can result, in such a way that the pictures arriving at the rear projection wall 2 do not correspond precisely to the shape and/or size of the rear projection wall 2, causing slight blurriness. For instance, arriving pictures may be smaller or larger than the rear projection wall 2. These distortions can be corrected by means of correction means, for instance by means of correction prisms in front of the lens elements of the projectors. The correction of distortions described can also be done by software without altering the optics, for instance in such a way that pixel zones that strike the rear projection wall 2 from the projectors 7a through 7p that are not generating beams of light are made dark. Furthermore, the projectors 7a through 7p can be aligned parallel, and the individual pictures can be shifted positionally correctly by the projector spacings. Peripheral gaps that occur lessen the effect of resolution only slightly. Moreover, the correction means may also be embodied as masks 17 with slitlike recesses (FIGS. 6 and 7).

FIG. 6 shows examples of overlapping zones 18, which can result from manufacturing variations in lenticular disks but have no adverse effect since they are comparatively small. Moreover, the transitions between the individual perspectives, with projectors located close together and with slight transition reserves in accordance with FIG. 7, can be superimposed slightly or in other words mixed in an interfering way. An improvement can then be attained by providing that the lens elements of the projectors are made laterally smaller into more of a slitlike form, thus with some loss of brightness, but compared to the standard use, there is still a slight improvement because the opening angle for the observer is located not at up to 180°—as with the diffuser wall—but only at a maximum of 60°, for instance.

The invention is not limited to the exemplary embodiments described, which can be modified in manifold ways. For instance, the picture views can also be made with conventional PCs and projected by means of conventional beam projectors. It is also possible to use the rear projection system described for selectively observing static or moving pictures. In addition, all or some of the projectors 7a through 7p can be located such that their beams of light do not strike the rear projection wall 2 directly but instead are deflected onto the rear projection wall 2 via deflection means, such as mirrors.

The third lenticular disk 10 may also be embodied in such a way that the number of lenses 10a is greater or much greater than the product of the number of perspectives and the number of horizontal pixels of a projector 7a through 7p, or of a view reproduced on the rear projection wall 2. In other words, the number of lenses 10a of the third lenticular disk 10, which is associated with a lens 8a of the first lenticular disk 8, can according to the invention not only be equal to but can also be greater or much greater than the number of perspectives. Since the lens width of the lenses 8a of the first lenticular disk 8 is preferably equivalent to the total width of the lenses 10a, associated with it, of the third lenticular disk 10, and as noted the number of lenses 10a associated with it can also be greater or much greater than the number of perspectives (projectors) provided, the least width of the lenses 10a is limited practically only by what is technically feasible. The same is correspondingly true for the lenses 11a. The result is great flexibility in the use of a rear projection wall 2 for various numbers of perspectives. For instance, a rear projection wall 2 that is designed for a large number of perspectives, such as 50 perspectives (as in a large motion picture auditorium) can also be used to show only a small number of perspectives, such as 16 perspectives, by allowing the unneeded perspectives to remain unused.

It is also possible to embody the rear projection system of the invention in such a way that it reproduces only two perspectives and is suitable for single observer. However, a large number, such as 50 or 100, of perspectives is preferably provided. To enable the production of at least N lenses 10a per lens 8a, sufficiently large rear projection walls 2 must be available, since the width of the displays on them, divided by the number of pixels and divided by the number N of perspectives, determines the maximum width of the lenses 10a. Alternatively, in the placement of many projectors, it can be advantageous if they can also be located one above the other with a horizontal offset. In that case, the vertical offset of the pictures can also be corrected optically by means of one additional horizontal prismatic lens. The width of the lenses 8a can furthermore be less than the pixel width on the rear projection wall 2, for instance by associating two lenses 8a with each pixel, while conversely, lens widths that are greater than one pixel as a rule lead to reduced resolution.

Figure 8:
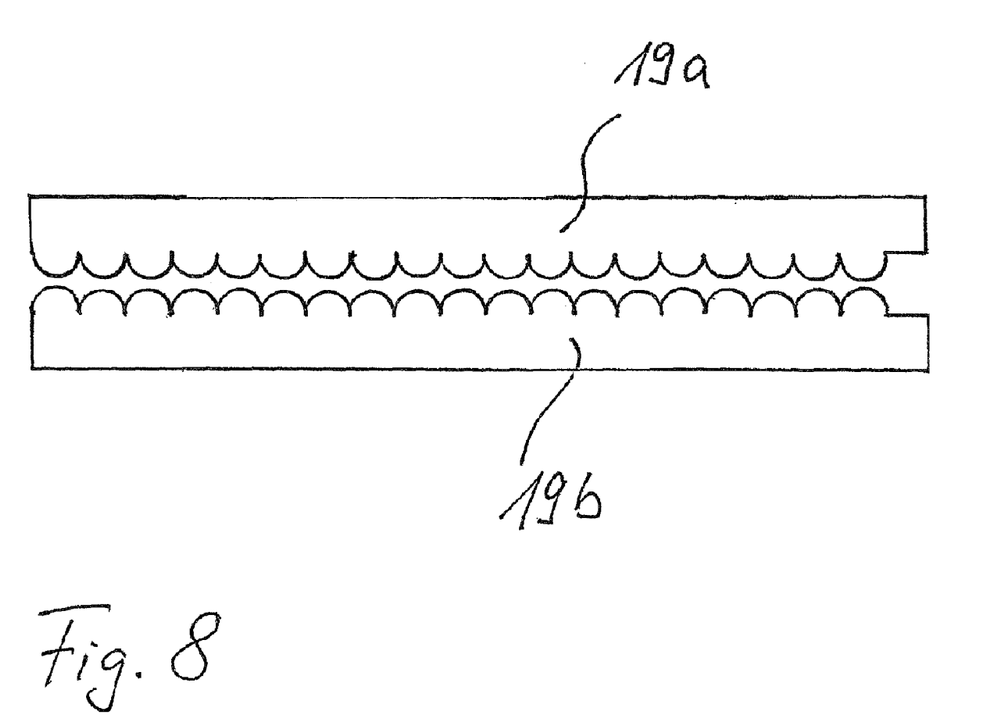
FIG. 8, schematically, two lenticular disks that are located mirror-symmetrically.

To shorten the focusing distance (distance of the picture generating unit 1 from the rear projection wall 2) or to increase the diffusion angle (the observer zone 5 becomes larger), the third lenticular disk 10 and/or the fourth lenticular disk 11 could each be replaced by two mirror-symmetrically arranged lenticular disks oriented toward one another, as is shown in FIG. 8 for two lenticular disks 19a, 19b. By means of a suitable embodiment of the first and second lenticular disks 8 and 9, the opening angle α can be increased as well. It is furthermore conceivable to put together the rear projection wall 2 from a plurality of parts, which are for instance manufactured and shipped separately and are assembled only on-site to make a rear projection wall. Finally, it is understood that the various characteristics may also be employed in other combinations than those shown and described here.

The invention claimed is:

1. A multi-perspective rear projection system for autostereoscopic reproduction of three-dimensional displays, including
    a rear projection wall (2), which has a first lenticular disk (8) on a back side (3) and a second lenticular disk (9) on a front side (4), and
    a picture generating unit (1), which is disposed behind the rear projection wall (2) and which has a plurality of projectors (7a through 7p) for projecting each of a plurality of projected perspectives of the three-dimensional displays, characterized in that the rear projection wall (2) between the first lenticular disk (8) and the second lenticular disk (9) includes a third lenticular disk (10), and all three lenticular disks (8, 9, 10) have many cylindrical lenses extending in the same direction; that the rear projection wall (2), between the second and third lenticular disks (9, 10), has a fourth lenticular disk (11) with cylindrical lenses, which are transverse to the cylindrical lenses of the other three lenticular disks (8, 9, 10); that the first and second lenticular disks (8, 9) have the same number of cylindrical lenses, while the third lenticular disk (10) includes at least N times as many lenses as the first lenticular disk (8), where N is equal to the number of perspectives; and that the lenses (11a) of the fourth lenticular disk (11) have a lens width (pitch) that is equivalent to the lens width of the lenses (10a) of the third lenticular disk (10).

2. The rear projection system as defined by claim 1, characterized in that the arrangement is selected such that pictures (perspectives) of the projectors (7a through 7p) are horizontally visible side by side on the front side of the rear projection wall (2), inside a preselected observer zone (5), and adjacent pictures have at most small overlapping zones (18).

3. The rear projection system as defined by claim 1, characterized in that the picture generating unit (1) has correction means (17) for correcting the beam path of at least one of the projectors (7a through 7p).

4. The rear projection system as defined by claim 3, characterized in that the correction means includes a correction prism.

5. The rear projection system as defined by claim 3, characterized in that the correction means includes a software-based correction device.

6. The rear projection system as defined by claim 3, characterized in that the correction means (17) has a slit mask.

7. The rear projection system as defined by claim 1, characterized in that the rear projection wall (2) is composed of a plurality of parts.

8. The rear projection system as defined by claim 1, characterized in that beams of light emitted by at least one of the projectors (7a through 7p) are deflected via deflection means to the rear projection wall (2).

9. The rear projection system as defined by claim 1, characterized in that the first lenticular disk (8) has a number of lenses (8a) that is equal to a number of horizontal picture elements (pixels) of the projectors (7a through 7p), or greater than that number.

10. The rear projection system as defined by claim 1, characterized in that the third lenticular disk (10) has a number of lenses (10a) that is greater or very much greater than a product of the number of perspectives and a number of horizontal pixels of a projector (7a through 7p).

11. The rear projection system as defined by claim 1, characterized in that a third lenticular disk (10) is replaced by two mirror-symmetrically located lenticular disks.

12. The rear projection system as defined by claim 1, characterized in that a fourth lenticular disk (11) is replaced by two mirror-symmetrically located lenticular disks.

* * * * *